March 10, 1942.         W. F. ALLENBY         2,275,878
HOUSEHOLD MIXING DEVICE
Filed Dec. 23, 1940
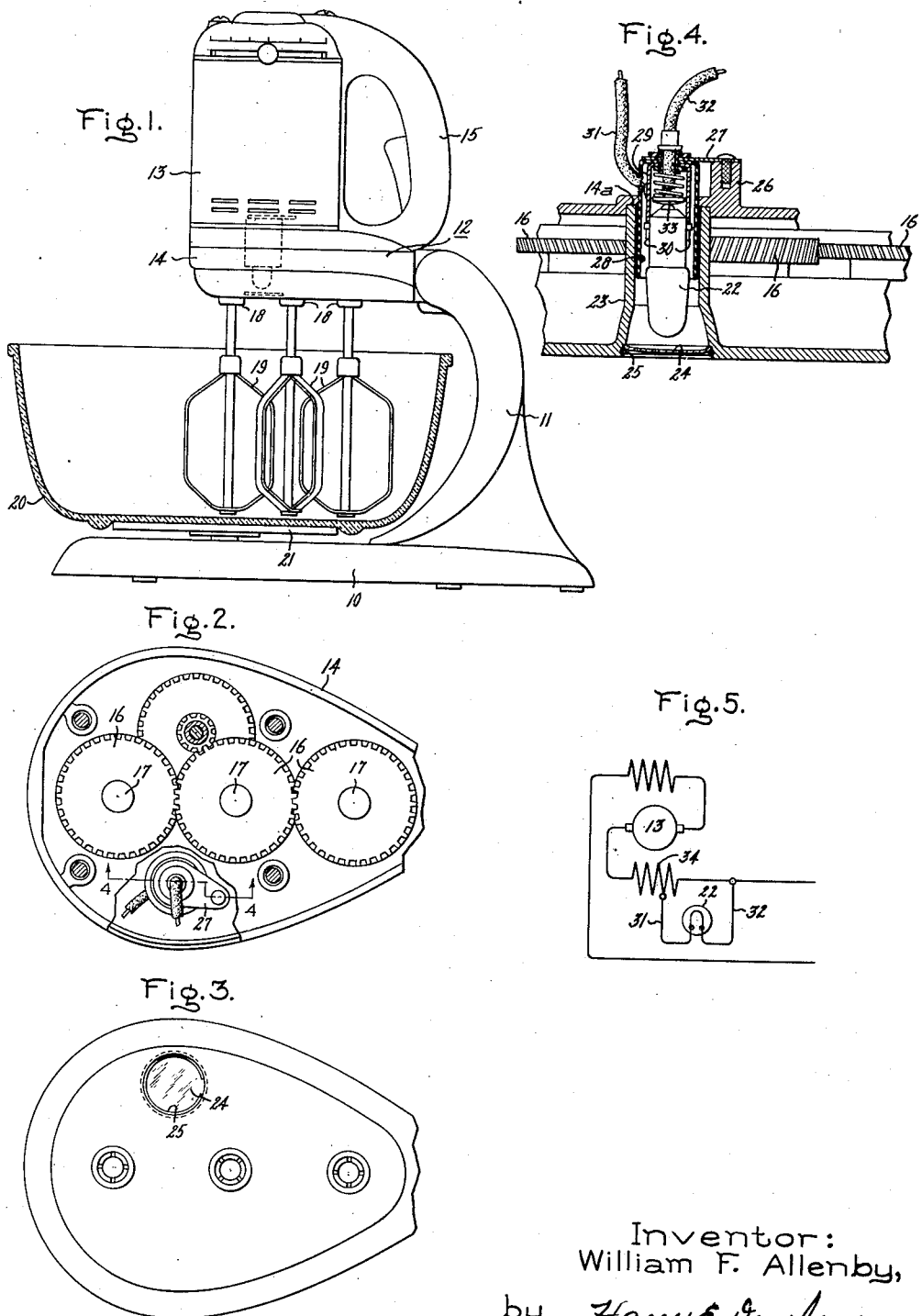
Inventor:
William F. Allenby,
by Harry E. Dunham
His Attorney.

Patented Mar. 10, 1942

2,275,878

UNITED STATES PATENT OFFICE 2,275,878

HOUSEHOLD MIXING DEVICE

William F. Allenby, Stratford, Conn., assignor to General Electric Company, a corporation of New York Application December 23, 1940, Serial No. 371,307

2 Claims. (Cl. 259—1)

This invention relates to a household mixing device and more particularly to the provision of new and improved illuminating means on such a device.

In most household mixing devices there is provided a base which supports a power unit upon which are provided one or more food working tools which project into a mixing bowl suitably supported upon the base. In many instances, these mixing devices are located in poorly lighted portions of a kitchen so that it is difficult to determine the consistency of the material in the mixing bowl. Moreover, even in a well lighted work space, the mixing bowl itself cuts off sufficient light so that it is difficult for the operator to determine how well the ingredients in the bowl have been mixed.

It is the primary object of this invention to provide a household mixing device with new and improved means for illuminating the ingredients being mixed within the mixing bowl of the device.

It is a more specific object of this invention to provide new and improved means on the power unit of a mixing device for illuminating the ingredients in a mixing bowl so that the effectiveness and completeness of the mixing operation may be readily determined.

It is a further more specific object of this invention to provide a household mixing device with new and improved illuminating means which includes an electric lamp connected in shunt with a portion of the field winding of the motor unit of the mixing device so as to be energized when the motor unit is energized.

A still further specific object of this invention is to provide a household mixing device with new and improved illuminating means which includes an illuminating lamp encased in the housing of the power unit for the mixing device and supported so that the light from the lamp is projected into the interior of the mixing bowl to illuminate this area so that the consistency and relative completeness of the mixing operation is readily determined by inspection.

Further objects and advantages of this invention will become apparent as the following detailed description proceeds and the features of novelty which characterize this invention will be pointed out with particularity in the claims annexed to and forming a part of this specification.

For a more complete understanding of this invention reference should be had to the accompanying drawing in which Fig. 1 shows a side elevation of a household mixing device of the vertical type to which the new and improved illuminating means of this invention has been applied; Fig. 2 is a fragmentary plan view partly in section and partly broken away showing the manner in which the improved illuminating means is secured in the casing of the power unit of the mixing device shown in Fig. 1; Fig. 3 is a view looking at the bottom of the power unit shown in Fig. 1 and showing the position of the illuminating means relative to the driving means of the power unit; Fig. 4 is a fragmentary sectional view taken on the line 4—4 of Fig. 2 and showing details of construction of the improved illuminating means of this invention; and Fig. 5 is a circuit diagram showing the manner in which the illuminating means is energized from the motor circuit for the power unit of the mixing device shown in Fig. 1.

For the purposes of illustrating one form of this invention, it has been shown as applied to a vertical type household mixing device comprising a base 10 and a supporting pedestal 11 upon which is removably mounted by suitable means (not shown) a power unit 12. This power unit comprises a suitable variable speed motor and a suitable speed reduction unit as is well known in the art. The motor is enclosed in a motor housing 13 and the speed reduction unit is enclosed in a gear housing 14. Extending between the motor housing and the gear housing is a suitable handle 15. As is well understood in the vertical type mixer art, the power unit will be mounted on the pedestal 11 so that its axis is substantially vertical and so that it can be tilted or rotated between the different food working positions.

The speed reduction unit enclosed in the housing 14 comprises a plurality of driven gears 16 which are mounted on drive shafts 17. The end of each drive shaft is provided with a coupling device 18 for releasably securing thereto a beater element 19 which extends downwardly into a mixing bowl 20 rotatably supported on the base 10 by means of the table 21.

As was previously explained, a mixing device of the type described above is often placed in a poorly lighted portion of a kitchen. Under such conditions it is often difficult for the operator to see at a glance whether or not the material in the food working bowl has been properly and adequately mixed. Even in those instances where the mixing device is in a well lighted area, the light is often cut off by the sides of the bowl 20 so that it is difficult to see the contents of the bowl.

In accordance with this invention there is provided improved means for illuminating the interior of the bowl 20. This means comprises an illuminating lamp 22 which is adapted to be positioned in a tubular member 23 which is integrally formed with the bottom wall of the gear housing and acts to direct light from the lamp downwardly into the bowl. As shown in Fig. 4, the member 23, which comprises a reentrant portion of the bottom wall of the gear housing, projects upwardly in the gear housing and lies at one side of the gear members 16 so as not to interfere with their operation. The member 23 is open at both ends and its lower end defines an opening in the bottom wall of the gear housing which is covered by a window 24 made of some suitable translucent or transparent material such as a transparent resinous material. The window 24 is removably held in position by means of a split resilient fastening ring 25. The upper end of the member 23 extends into a recess 14a provided in the top wall of the gear housing. The fit between the member and the recess is made sufficiently snug so that a seal is formed which prevents oil or grease within the gear housing from leaking into the space defined by the tubular member 23.

Projecting upwardly from the top wall of the gear housing 14 is a boss 26 to which a bracket 27 is secured and mounted on the bracket 27 is a bayonet type socket for supporting the lamp 22. This socket comprises an outer casing 28 of insulating material which extends downwardly into the member 23. Concentrically arranged within this insulating housing is a cylindrical contact member 29 having offset slots at its lower end which are adapted to be engaged by prongs 30 provided on the periphery of the lamp. Soldered to the contact member 29 is a conductor 31 and projecting through the bracket 27 and through the center portion of the insulating shell 28 is a second conductor 32 which is electrically connected to a resiliently mounted contact bottom 33 supported in the member 29.

In order to simplify the electrical connections to the mixing device the lamp 22 is connected in shunt with a portion of the energizing circuit of the motor for the power unit 12. This arrangement also makes it possible to use a relatively low voltage lamp as the illuminating means whereby the life of the lamp is materially increased and its cost reduced. Referring to Fig. 5, it will be observed that the lamp 22 is connected in shunt with a portion of the motor field 34 and thus, so long as the motor is energized, the lamp will be energized.

It is believed that the operation of the improved illuminating means of this invention will be obvious from the foregoing detail description. Briefly, however, whenever the mixing device is in use, the illuminating lamp 22 will be energized and the light therefrom will be projected through the window 24 downwardly into the mixing bowl 20. Thus the contents of the mixing bowl will be illuminated and their consistency and the adequacy of the mixing operation may be readily perceived by the operator. In the event that the lamp 22 burns out it may readily be replaced by removing the fastening ring 25 which holds the window 24 in place.

It is to be particularly noted that the improved illuminating means is totally enclosed in the casing of the power unit of the mixing device and is adapted to be energized from the same source of supply as the motor of the power unit. Moreover, it will be observed that the improved illuminating means is both simple in construction and easily assembled in the power unit so that a low cost advantageous accessory for a household mixing device is produced.

While this invention has been described as applied to a mixing device of the vertical type, it is obvious that it could also be adapted for use in a mixing device of any other type such as a horizontal type of mixer. Moreover, while a particular embodiment of this invention has been shown, it will be understood of course that it is not to be limited thereto since many modifications may be made and it is contemplated by the appended claims to cover any such modifications as fall within the true spirit and scope of this invention.

What I claim as new and desire to secure by Letters Patent of the United States is:

1. A household mixing device comprising a mixing bowl, a plurality of mixing elements projecting into said bowl, a power unit for operating said mixing elements, a casing enclosing said power unit, tubular means defining an opening in the wall of said casing directly above said mixing bowl, said tubular means projecting inwardly from said opening, a transparent window covering said opening defined by said tubular means, an illuminating lamp, and means for supporting said lamp in said tubular means so that the light therefrom will be directed downwardly through said window and into said bowl.

2. A mixing device comprising a base member adapted to support a mixing bowl, a power unit supported on said base above said bowl, a food working element arranged to be driven by said unit and to project into said bowl, said power unit having upper and lower walls above said bowl and forming part of a housing enclosing lubricated mechanism, said bottom wall having a tubular reentrant portion forming a light directing passage, the upper end of said tubular portion engaging said upper wall in sealing relation to prevent a flow of lubricant from said housing into said passage, and an electric lamp mounted in said passage so that light projected therefrom is directed into said bowl to illuminate material acted upon by said food working element.

WILLIAM F. ALLENBY.